United States Patent
Koi (10) Patent No.: US 10,998,569 B2
(45) Date of Patent: May 4, 2021

(54) CELL, CELL STACK DEVICE, MODULE AND MODULE HOUSING DEVICE

(71) Applicant: KYOCERA Corporation, Kyoto (JP)

(72) Inventor: Makoto Koi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 343 days.

(21) Appl. No.: 15/753,990

(22) PCT Filed: Aug. 18, 2016

(86) PCT No.: PCT/JP2016/074079
§ 371 (c)(1),
(2) Date: Feb. 21, 2018

(87) PCT Pub. No.: WO2017/033822
PCT Pub. Date: Mar. 2, 2017

(65) Prior Publication Data
US 2018/0241062 A1    Aug. 23, 2018

(30) Foreign Application Priority Data
Aug. 22, 2015  (JP) .............................. JP2015-164301

(51) Int. Cl.
*H01M 8/1246* (2016.01)
*H01M 8/0217* (2016.01)
(Continued)

(52) U.S. Cl.
CPC ....... *H01M 8/1246* (2013.01); *H01M 8/0215* (2013.01); *H01M 8/0219* (2013.01);
(Continued)

(58) Field of Classification Search
CPC ............. H01M 8/1246; H01M 8/0215; H01M 8/0219; H01M 8/0228; H01M 8/2425;
(Continued)

(56) References Cited

U.S. PATENT DOCUMENTS

| 2009/0098436 A1* | 4/2009 | Yamada | .............. | H01M 4/9075 |
| | | | | 429/496 |
| 2011/0305972 A1* | 12/2011 | Kobayashi | .......... | H01M 8/1253 |
| | | | | 429/496 |

(Continued)

FOREIGN PATENT DOCUMENTS

| JP | 2005158529 A | 6/2005 |
| JP | 2012054014 A | 3/2012 |

(Continued)

*Primary Examiner* — Thanh Truc Trinh
(74) *Attorney, Agent, or Firm* — Viering, Jentschura & Partner mbB (57) ABSTRACT

The cell according to the present disclosure has a support body having a length direction and a pair of main surfaces, and an element part in which a first electrode, a solid electrolyte layer having an oxide containing a rare earth element oxide as a main component, and a second electrode are stacked, in that order, on one of the main surfaces of the support body. The cell also has a first layer provided on the other main surface of one end part of the support body in the length direction, which layer contains a different amount of a rare earth element oxide that is the same oxide as the main component of the solid electrolyte layer, and is stronger than the solid electrolyte layer. A second layer is provided between the first layer and the support body, and the second layer has a higher content of a component that is the same as the component contained in the support body than the first layer, and also contains the same component as the first layer.

8 Claims, 7 Drawing Sheets

(51) Int. Cl.
*H01M 8/0215* (2016.01)
*H01M 8/0228* (2016.01)
*H01M 8/2425* (2016.01)
H01M 8/1253 (2016.01)
H01M 8/2475 (2016.01)
H01M 8/124 (2016.01)

(52) U.S. Cl.
CPC ....... *H01M 8/0228* (2013.01); *H01M 8/2425* (2013.01); *H01M 8/1253* (2013.01); *H01M 8/2475* (2013.01); *H01M 2008/1293* (2013.01); *H01M 2300/0074* (2013.01); *Y02E 60/50* (2013.01)

(58) Field of Classification Search
CPC ............. H01M 8/1253; H01M 8/2475; H01M 2300/0074; Y02E 60/525
See application file for complete search history.

(56) References Cited

U.S. PATENT DOCUMENTS

2014/0134514 A1* 5/2014 Okamoto ............ H01M 8/0247
429/457
2016/0372774 A1 12/2016 Koi

FOREIGN PATENT DOCUMENTS

JP           2015125897 A    7/2015
WO       2014208730 A1   12/2014

\* cited by examiner

CELL, CELL STACK DEVICE, MODULE AND MODULE HOUSING DEVICE

RELATED APPLICATIONS

The present application is a national stage entry according to 35 U.S.C. § 371 of PCT application No.: PCT/JP2016/074079 filed on Aug. 18, 2016, which claims priority from Japanese application No.: 2015-164301 filed on Aug. 22, 2015 and is incorporated herein by reference in its entirety.

TECHNICAL FIELD

The present invention relates to a cell, a cell stack device, a module and a module housing device.

BACKGROUND ART

In recent years, various fuel cell devices that house cell stack devices, formed by electrically and serially connecting a plurality of one type of cell known as a solid oxide fuel cell (hereinafter sometimes referred to simply as cell), in housing containers have been proposed as next-generation energy.

This kind of cell has a structure where a solid electrolyte layer is sandwiched by a fuel electrode and an oxygen electrode. A cell generates electricity by causing a fuel gas to flow to the fuel electrode and a gas containing oxygen to the oxygen electrode, and warming (for example, see Patent Document 1).

Patent Document 1 also discloses that a first layer stronger than the solid electrolyte layer is provided on a support body to enhance the strength of the cell.

PRIOR ART DOCUMENTS

Patent Literature

Patent Document 1: WO 2014/208730

SUMMARY OF THE INVENTION

The cell according to the present disclosure includes a support body including a length direction and a pair of main surfaces, and an element part in which a first electrode, a solid electrolyte layer containing an oxide containing a rare earth element oxide as a main component, and a second electrode are stacked, in that order, on one of the main surfaces of the support body. Furthermore, the cell according to the present disclosure includes a first layer provided on the other main surface of one end part of the support body in the length direction, the first layer containing the same oxide as a main component as the main component of the solid electrolyte layer with a different amount of a rare earth element oxide, and is stronger than the solid electrolyte layer. A second layer is provided between the first layer and the support body, and the second layer has a higher content of a component that is the same as a component contained in the support body than the first layer, and contains the same component as the first layer.

A cell stack device according to the present disclosure includes a plurality of the cells, and the plurality of the cells are electrically connected.

A module according to the present disclosure includes the cell stack device housed in a housing container.

A module housing device according to the present disclosure includes the module, and an auxiliary device configured to operate the module, housed in an external case.

BRIEF DESCRIPTION OF THE DRAWINGS

FIGS. 1A and 1B illustrate a hollow flat plate type cell, where

FIGS. 5A and 5B illustrate an example of a cell stack device, where

DESCRIPTION OF THE PREFERRED EMBODIMENTS

A cell, a cell stack device, a module, and a module housing device will be described using FIGS. 1A to 9.

In the following description, an example of a solid oxide type fuel cell is used as a cell for configuring a cell stack. Note that the same reference numerals are used for the same configurations.

Figure 1A:
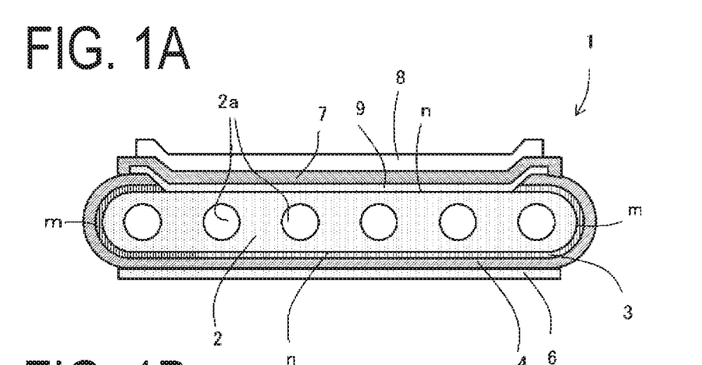
FIG. 1A is a cross-sectional view and FIG. 1B is a side view seen from an interconnector side.
Figure 1B:
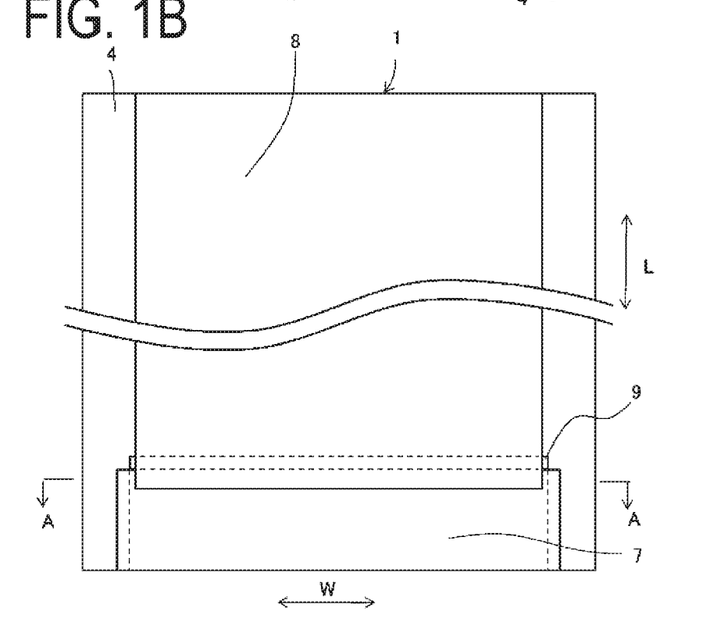
Figure 2:
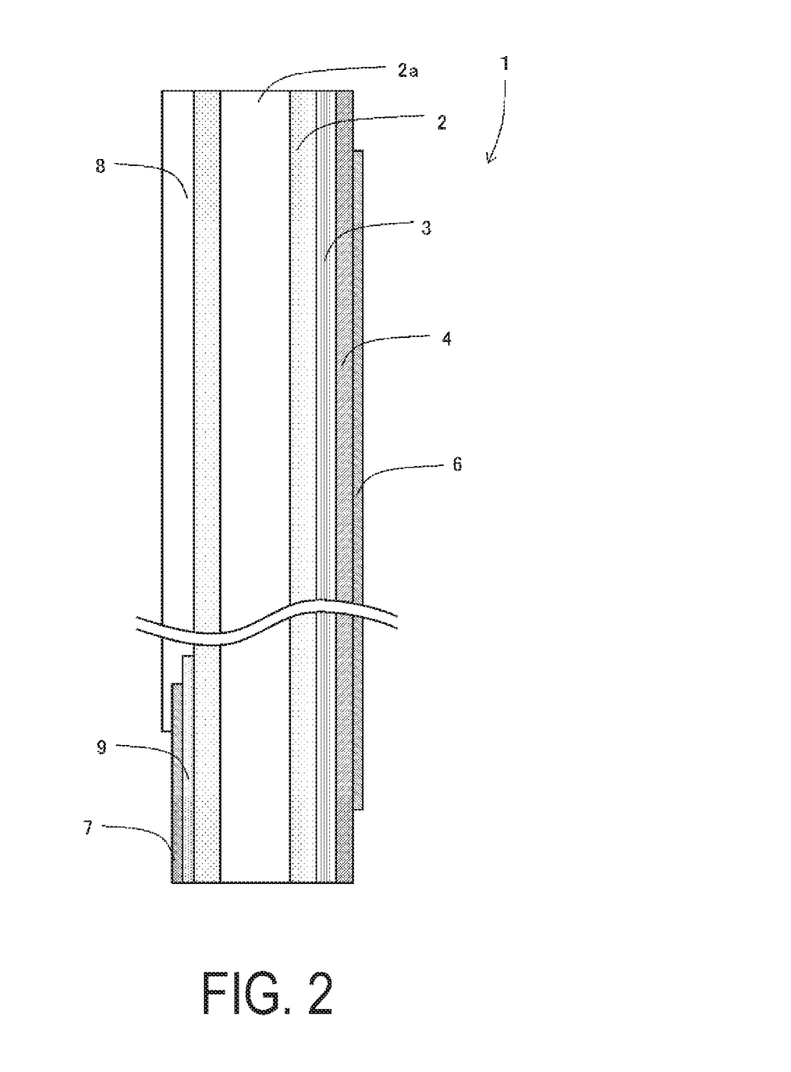
FIG. 2 is a longitudinal cross-sectional view of the cell in FIGS. 1A and 1B.

FIGS. 1A and 2A illustrate an example of a hollow flat plate type cell 1, where FIG. 1A is a cross-sectional view thereof and FIG. 1B is a side view thereof seen from an interconnector side. FIG. 2 is a longitudinal cross-sectional view of the cell in FIGS. 1A and 1B.

A cell 1 illustrated in FIGS. 1A and 1B and FIG. 2 is a hollow flat plate type cell with a flat cross section, and is provided with a conductive support body 2 that has, when seen in its entirety, an elliptical cylindrical body (in other words, an elliptical cylinder shape). An interior of the support body 2 is penetrated in a length direction L of the cell 1 by a plurality of gas passages 2a at appropriate intervals, and the cell 1 has a structure where a variety of members are provided on the support body 2.

As can be understood from the shape illustrated in FIG. 1A, the support body 2 includes, in the cell 1 illustrated in FIGS. 1A and 1B, a pair of mutually parallel flat surfaces n and an arc shaped surface (side surface) m for connecting the pair of flat surfaces n. The flat surfaces n are substantially parallel to one another, and a porous fuel electrode (first electrode) 3 is provided so as to cover one of the flat surfaces n (one main surface: surface on the lower side in FIG. 1A) and the arc shaped surface in on both sides in a width direction W of the cell 1, and a solid electrolyte layer 4 is also provided so as to cover the fuel electrode 3. The solid electrolyte layer 4 is made of ceramic having gas barrier properties, where a thickness of said layer can be, from the perspective of enhancing power generation capabilities, 40 µm or less, especially 20 µm or less, and even more especially 15 µm or less.

An interconnector 8 made of a conductive ceramic having gas barrier properties is provided on the other flat surface n (other main surface: surface on the upper side in FIG. 1A) on which an oxygen electrode 6 is not stacked.

That is, the fuel electrode 3 and the solid electrolyte layer 4 are provided from one of the flat surfaces (one main surface) to the other flat surface n (other main surface) through both ends of the arc shaped surface m, and both end parts in the width direction W of the interconnector 8 are stacked on and joined to both end parts in the width direction W (left to right in FIG. 1B) of the solid electrolyte layer 4. The solid electrolyte layer 4 is provided on the entire surface of the one main surface.

Furthermore, the support body 2 is surrounded by the solid electrolyte layer 4 and the interconnector 8 having gas barrier properties, and is thus configured so that a fuel gas circulating inside thereof does not leak outside. In other words, the solid electrolyte layer 4 and the interconnector 8 form a tubular body having gas barrier properties, the interior of the tubular body is set as a fuel gas passage, and the fuel gas supplied to the fuel electrode layer 3 and the gas containing oxygen supplied to the oxygen electrode layer 6 are interrupted by the tubular body.

Described more specifically, although not illustrated in the drawings, the oxygen electrode 6 having a rectangular flat surface shape is provided on the one main surface n of the support body 2 excluding the upper and lower ends of the support body 2, meanwhile, as illustrated in FIG. 1B and FIG. 2, the interconnector 8 is provided so as to extend from the upper end toward the lower end side excluding the lower end part of the support body 2.

Here, a part where the fuel electrode 3 and the oxygen electrode 6 face each other through the solid electrolyte layer 4 in the cell 1 functions as a power generation element part. That is, gas containing oxygen, such as air, and the like, flows to an outside of the oxygen electrode 6, and fuel gas (gas containing hydrogen) flows into the gas passage 2a inside the support body 2. Then, current generated by this power generation is collected through the interconnector 8 provided on the support body 2.

As illustrated in FIGS. 1A and 1B and FIG. 2, in the cell 1, a first layer 7 is provided on the other main surface on one end part (lower end part) of the support body 2 in a length direction. In the example illustrated in FIGS. 1A and 1B, both end parts in the width direction W of the first layer 7 are provided on both end parts in the width direction W of the solid electrolyte layer 4. On one end part of the support body 2, in a part where the interconnector 8 is not provided, the first layer 7 and the solid electrolyte layer 4 form an elliptical cylinder body having gas barrier properties.

Furthermore, as illustrated in FIGS. 1A and 1B and FIG. 2, a second layer 9 is provided between the first layer 7 and the support body 2. As illustrated in FIGS. 1A and 1B and FIG. 2, the second layer 9 is provided on one end part of the support body 2 in the length direction. Furthermore, as in the example illustrated in FIGS. 1A and 1B, both end parts in the width direction W of the second layer 9 are joined to both end parts of a front surface in the width direction W of the solid electrolyte layer 4. Both end parts in the width direction W of the second layer 9 are sandwiched by both ends in the width direction W of the solid electrolyte layer 4 and both ends in the width direction W of the first layer 7. Note that, in the example illustrated in FIGS. 1A and 1B, both the left and right end parts of the first layer 7 extend outward in the width direction of the cell 1 from both the left and right end parts of the second layer 9.

The cell 1 will be used below to describe each member that configures the cell according to the present embodiment.

It is required for the support body 2 to have gas permeability in order to allow the fuel gas to pass through to the fuel electrode 3 and electrical conductivity for collecting current through the interconnector 8, and thus the body is formed, for example, from Ni and/or NiO and an inorganic oxide such as, for example, a specific rare earth element oxide.

The specific rare earth element oxide is used in order to bring the thermal expansion coefficient of the support body 2 close to the thermal expansion coefficient of the solid electrolyte layer 4, and at least one type of rare earth element oxide selected from a group consisting of Y, Lu, Yb, Tm, Er, Ho, Dy, Gd, Sm, and Pr can be used in combination with N and/or NiO.

Specific examples of such rare earth element oxides include $Y_2O_3$, $Lu_2O_3$, $Yb_2O_3$, $Tm_2O_3$, $Er_2O_3$, $Ho_2O_3$, $DY_2O_3$, $Gd_2O_3$, $Sm_2O_3$, and $Pr_2O_3$. $Y_2O_3$ and $Yb_2O_3$ can be used because both dissolve as solids in Ni and/or NiO and neither reacts therewith to any extent, while both have coefficients of thermal expansion comparable to that of the solid electrolyte layer 4, and are inexpensive.

Furthermore, from the perspective of maintaining good connectivity and bringing a thermal expansion coefficient close to that of the solid electrolyte layer 4, the support body 2 a conductive support body 2, the Ni and/or NiO and the rare earth element oxide are present at a volume ratio of from 35:65 to 65:35.

Here, other metal components or oxide components may be contained in the support body 2 in a range that does not impair the required characteristics thereof.

Moreover, since it is necessary for the support body 2 to have fuel gas permeability, said body can generally have an open porosity of 30% or higher, and particularly in the range of from 35 to 50%, in addition, the conductivity of the support body 2 can be 300 S/cm or higher, and, particularly, 440 S/cm or higher.

Note that the length of the flat surface n of the support body 2 (length in a width direction of the support body 2) is from 15 to 35 mm, the length of the arc shaped surface m (length of the arc) is from 2 to 8 mm, and the thickness of the support body 2 (thickness between the flat surfaces n) is from 1.5 to 5 mm. The length of the support body 2 is, for example, from 100 to 300 mm.

The fuel electrode 3 generates an electrode reaction and can itself use a known porous conductive ceramic. For example, $ZrO_2$ in which the rare earth element oxide is dissolved as a solid, $CeO_2$ in which the rare earth element oxide is dissolved as a solid, and Ni and/or NiO can be used. Note that a rare earth element exemplified in the support body 2 can be used as the rare earth element, for example, $ZrO_2$ (YSZ) in which a $Y_2O_3$ is dissolved as a solid and Ni and/or NiO can be used.

The amounts of $ZrO_2$ in which the rare earth element oxide is dissolved as a solid, or of $CeO_2$ in which the rare earth element oxide is dissolved as a solid contained in the fuel electrode 3 can be in the range of from 35 to 65 vol %. Furthermore, the amount of Ni or NiO contained can be in the range of from 65 to 35 vol %. Furthermore, the open porosity of the fuel electrode layer 3 can be 15%, and, particularly, in the range of from 20 to 40%, and the thickness thereof can be from 1 to 30 μm.

In addition, since the fuel electrode 3 may be provided at a position facing the oxygen electrode 6, for example, the fuel electrode 3 may be provided only on the flat surface n on the lower side of the support body 2 on which the oxygen electrode 6 is provided. That is, the structure may be such that the fuel electrode 3 is provided only on the flat surface n on the lower side of the support body 2, and the solid electrolyte layer 4 is provided on the flat surface n on the upper side of the support body 2 where a fuel electrode 3 front surface, front surfaces of both arc shaped surfaces of the support body 2, and the fuel electrode 3 are not provided.

As was described above, the solid electrolyte layer 4 can contain, as a main component, from 3 to 15 mol % of partially stabilized or stabilized $ZrO_2$ in which a rare earth element oxide such as Y, Sc, Yb, or the like, has been dissolved as a solid. Furthermore, the rare earth element is preferably Y because Y is inexpensive. The solid electrolyte layer 4 is not limited to a ceramic formed of partially stabilized or stabilized $ZrO_2$ and may, of course, be a conventionally known, for example, solid electrolyte layer of a ceria type or a lanthanum gallate-type in which a rare earth element such as Gd, Sm, or the like, is dissolved as a solid.

A conductive ceramic made of a so-called $ABO_3$ type perovskite oxide can be used as the oxygen electrode 6. At least one type of transition metal perovskite oxide containing La, in particular, $LaMnO_3$-based oxide, $LaFeO_3$-based oxide, and $LaCoO_3$-based oxide, in which Sr and La coexist at the A site can be used as the perovskite oxide. $LaCoO_3$-based oxide is particularly preferable from the point of view of high electrical conductivity at an operating temperature of approximately 600 to 1000° C. Here, Co may be present along with Fe or Mn at the B site in the perovskite oxide described above.

In addition, the oxygen electrode 6 needs to have gas permeability, accordingly, the electrically conductive ceramic (perovskite oxide) which forms the oxygen electrode 6 can have an open porosity of 20% or greater, and, particularly, in the range of from 30 to 50%. Furthermore, the thickness of the oxygen electrode 6 can be from 30 to 100 μm from the point of view of current collecting properties.

The interconnector 8 is formed from a conductive ceramic. Since the fuel gas (gas containing hydrogen) and the gas containing oxygen come into contact, it is necessary to have reduction resistance and oxidation resistance. Therefore, a lanthanum chromite-based perovskite oxide ($LaCrO_3$-based oxide) can be used as an electrically conductive ceramic having reduction resistance and oxidation resistance. In particular, from the perspective of getting close to the thermal expansion coefficient of the support body 2 and the solid electrolyte layer 4, an $LaCrMgO_3$-based oxide containing Mg in the B site can be used. As long as the material of the interconnector 8 is a conductive ceramic, said material is not particularly limited.

In addition, the thickness of the interconnector 8 can be from 10 to 60 μm from the points of view of gas leakage prevention and electrical resistance. In this range, gas leakage can be prevented and the electrical resistance reduced.

Furthermore, with the cell 1 according to the present embodiment illustrated in FIGS. 1A and 1B and FIG. 2, the first layer 7 is provided on the other main surface of one end part (lower end part) of the support body 2 in the length direction. As is described below, one end part of the cell 1 forms a root part that is joined to a gas tank. Therefore, by reinforcing the root part of the cell 1 using the first layer 7, the generation of cracks, and the like, can be suppressed, even when said part is joined to a gas tank.

The first layer 7 contains the same oxide as a main component as the main component of the solid electrolyte layer 4 with a different amount of the rare earth element oxide, and is stronger than the solid electrolyte layer 4. For example, a zirconia type oxide containing the rare earth element oxide, a ceria type oxide containing the rare earth element oxide, a lanthanum gallate type oxide, or the like, can be used as the material that configures the first layer 7.

Here, in a case where the material that configures, for example, the solid electrolyte layer 4, has $ZrO_2$ containing the rare earth element oxide as a main component, it is preferable that the first layer 7 contain less of the rare earth element oxide than the solid electrolyte layer 4. On the other hand, in a case where the material that configures, for example, the solid electrolyte layer 4, has $CeO_2$ containing the rare earth element oxide as a main component, it is preferable that the first layer 7 contain more of the rare earth element oxide than the solid electrolyte layer 4. Using this kind of configuration allows the first layer 7 to be made stronger than the solid electrolyte layer 4, which makes it possible to suppress impacts on the solid electrolyte layer 4 when impacts are applied from outside, which, in turn makes it possible to prevent the solid electrolyte layer 4 from becoming damaged. Here, main components refer to the components that make up 90 wt. % of the elements configuring the solid electrolyte layer 4 and the first layer 7.

Note that it is possible to determine which is stronger, the solid electrolyte layer 4 or the first layer 7, by pressing an indenter into a part in a cell 1 that has been broken apart and a mirror surface formed where the solid electrolyte layer 4 and the first layer 7 are subjected to the same force and then using an ultra-micro hardness tester to measure the maximum pressing depth encountered during the pressing.

In particular, from the perspective of enhancing power generation capabilities, the main component of the solid electrolyte layer 4 can be partially stabilized zirconia, for example, $ZrO_2$ in which, for example, from 7 to 9 mol % of $Y_2O_3$ has been dissolved as a solid. Furthermore, the main component of the first layer 7 can be $ZrO_2$ where the contained amount of the rare earth element oxide is, for example, from 3 to 5 mol % of $Y_2O_3$.

Here, while the width (length of the width direction W of the cell 1) of the first layer 7 can be set as appropriate, it is preferable, from the perspective of gas sealing properties, that said width be set wider than the distance between the two end parts of the solid electrolyte layer 4. Furthermore, similar to the example illustrated in FIGS. 1A and 1B, the width may be smaller than, for example, the width of the flat surface n of the support body 2. Furthermore, though not illustrated in the drawings, the width may be same as the width of the flat surface n of the support body 2. Meanwhile, though the length of the first layer 7 depends on the length of the cell 1, from the perspective of enhancing the strength of the cell 1 while maintaining a power generation area, said length can be, for example, from approximately 3 to 10% of the length of the support body 2.

From the perspective of enhancing said strength even more, the thickness of the first layer 7 can be made thicker than the thickness of the solid electrolyte layer 4. Furthermore, for example, while the thickness of the solid electrolyte layer 4 is thinner than 30 μm, the thickness of the first layer 7 can be from 30 to 100 μm.

In the present embodiment, the second layer 9 is provided between the first layer 7 and the support body 2, and the second layer 9 has a higher content of a component that is the same as the component contained in the support body 2 than the first layer 7, and also contains the same component as the first layer 7. That is, because the second layer 9 and the support body 2 contain the same component, the second layer 9 is joined to the support body 2 relatively securely, and thus the second layer 9 can be prevented from peeling away from the support body 2. On the other hand, because the second layer 9 and the first layer 7 contain the same component, the second layer 9 and the first layer 7 are joined relatively securely. Furthermore, because the first layer 7, which is joined to the second layer 9, is also kept from peeling away from the support body 2, not only can a function for protecting the solid electrolyte layer 4 be sustained, but the long-term reliability of the cell 1 can be enhanced because gas can be prevented from leaking inside the support body 2.

In greater detail, as was described above, the second layer 9 contains more of the same component that is contained in the support body 2 than the first layer 7 does. For example, in a case where the support body 2 is made from Ni and/or NiO and a rare earth element oxide, such as $Y_2O_3$, and the like, the second layer 9 contains more Ni and/or NiO than the first layer 7 does. Furthermore, in a case where the first layer 7 is made from $ZrO_2$ in which the rare earth element oxide has been dissolved as a solid, the second layer 9 may also contain $ZrO_2$ in which the rare earth element oxide has been dissolved as a solid.

In a case where the volume ratio between the rare earth element oxide, such as $Y_2O_3$, or the like, and the Ni and/or NiO in the support body 2 is in the range of from 40:60 to 60:40, the volume ratio between the Ni and/or NiO and the $ZrO_2$ in which the rare earth element oxide is dissolved as a solid in the second layer 9 is in the range of from 40:60 to 60:40, furthermore, the volume ratio of the Ni and/or NiO in the first layer 7 is either lower than in the second layer 9 or the first layer does not contain Ni or NiO.

The volume ratio may be calculated in order to calculate the amount of Ni and NiO contained. To calculate the volume ratios of Ni and NiO, the cross sections of the support body 2, the first layer 7, and the second layer 9 are each ground down, and a semi-quantitative value may be obtained for Ni by performing wavelength dispersive X-ray analysis (WDS) on the cross sections.

Furthermore, while a case was described in the previous example where the volume ratio between Ni and/or NiO was higher than the first layer 7 in a case where the support body 2 was made from Ni and/or NiO and the rare earth element oxide, such as $Y_2O_3$, and the like, a configuration is also possible where the second layer 9 contains more of the rare earth element oxide, such as $Y_2O_3$, and the like, than the first layer 7 does.

Furthermore, as with the example illustrated in FIG. 1B and FIG. 2, the second layer 9 may be extended farther to the other end part side in the length direction than the first layer 7. In this case, there are no longer any parts where the first layer 7 connects directly to the support body 2 on the other end part side of the first layer 7. Therefore, the first layer 7 is reinforced by and joined with the support body 2 through the second layer 9, and the support body 2 is kept from peeling away the support body 2 on the other end part side of the first layer 7.

Figure 3:
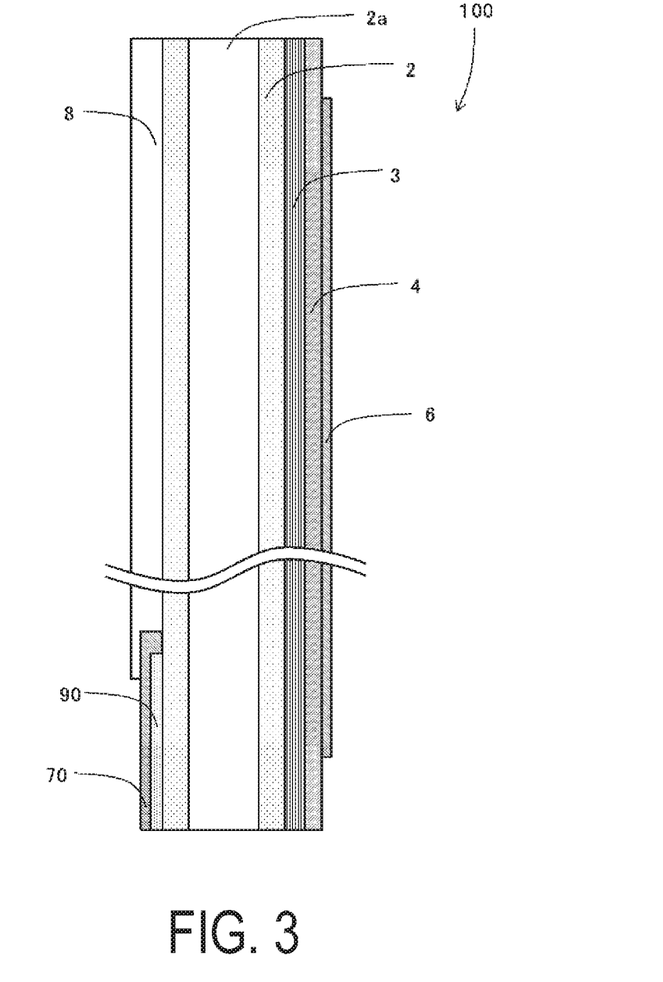
FIG. 3 is a longitudinal cross-sectional view of a cell according to a different embodiment.

FIG. 3 is a longitudinal cross-sectional view of a cell according to a different embodiment. Similar to the cell 100 of the example illustrated in FIG. 3, a second layer 90 may extend farther to an other end part side in a length direction than a first layer 70. In this case, although the other end part in the length direction of the first layer 70 is directly connected to the main surface of the support body 2, because a part thereof makes contact with the second layer 90, the first layer 70 can be kept from peeling away from the support body 2.

Similar to the example illustrated in FIGS. 1A to 3, the interconnector 8 is provided so as to cover the other end parts in the length directions of the first layers 7 and 70, and there is an area where the second layer 9 is not provided that is on the other main surface of the support body 2, and it is preferable that the interconnector 8 and the support body 2 abut and are joined in this area. This configuration reduces the electrical connection resistance between the interconnector 8 and the support body 2.

Figure 4:
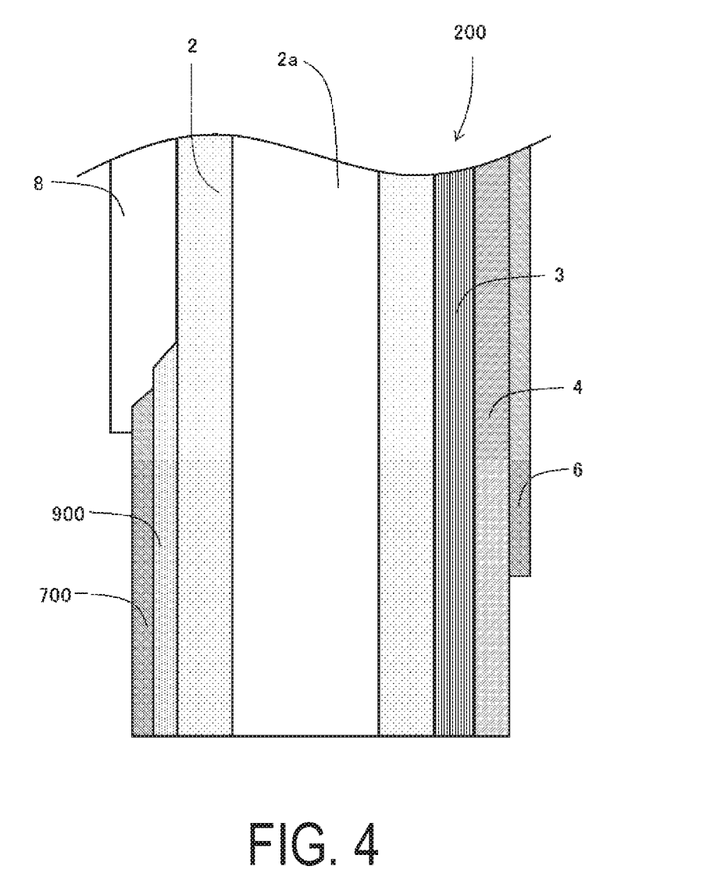
FIG. 4 is an enlarged longitudinal cross-sectional view of the cell according to a different embodiment.

FIG. 4 is an enlarged longitudinal cross-sectional view of the cell according to a different embodiment. Similar to the cell 200 of the example illustrated in FIG. 4, an other end part in the length direction of a second layer 900 may be tapered when seen in cross section. In other words, the thickness of the second layer 900 becomes gradually thinner toward the other end part in the length direction. Therefore, in a case where the interconnector contains La, the amount of La that dissipates to the support body 2 through the second layer 900 gradually becomes larger toward the other end part. Therefore, because the amount of dissipated La varies gradually near the other end part of the second layer 900, an amount of shrinkage in the support body 2 caused by La dissipation also varies gradually near said other end part. Accordingly, the occurrence of large differences in the amount of shrinkage in the support body 2 at a boundary between the area covered and the area not covered by the second layer 900 in the support body 2 can be suppressed. Accordingly, the occurrence of cracks caused by differences in shrinkage amounts in the support body 2 at the aforementioned boundary can be suppressed.

Furthermore, similar to the example illustrated in FIG. 4, the other end part is tapered in the length direction of a first layer 700 when seen in cross section, in other words, the thickness of the second layer 900 gradually becomes thinner toward the other end part in the length direction. Through this configuration, the amount of La dissipated to the second layer 900 positioned directly below the first layer 700 gradually varies near the other end part of the first layer 700. Accordingly, the occurrence of cracks in the second layer 900 at a boundary between a part that shrinks and a part that does not shrink due to the dissipation of La can be suppressed. Therefore, cracks occurring in the second layer 900 can be kept from propagating to the support body 2 and causing cracks to occur in said support body 2.

One example of the method for manufacturing the cell 1 of the present embodiment described above will be described below.

First, for example, a clay is prepared by mixing an Ni and/or NiO powder, a powder of the rare earth element oxide, such as $Y_2O_3$, and the like, an organic binder, and a solvent, and then, a support body molding is produced by extrusion molding using the clay, and then dried. Here, a calcined body in which the support body molding is calcined for 2 to 6 hours at from 900 to 1000° C. may be used as the support body molding.

Next, for example, a raw material of NiO and $ZrO_2$ (YSZ) in which $Y_2O_3$ is dissolved as a solid are weighed and mixed in accordance with a predetermined compounding composition. After this, a fuel electrode slurry is prepared by mixing an organic binder and a solvent into the mixed powder.

Then, a slurry formed by adding toluene, a binder powder (hereinafter, the binder powder to be adhered to the $ZrO_2$ powder is polymeric, for example, an acrylic resin), a commercially-available dispersing agent, and the like, to $ZrO_2$ powder forming a solid solution with a rare earth element oxide is molded using a doctor blade method, or the like, to produce a sheet-shaped solid electrolyte layer molding.

A fuel electrode molding is formed by applying the slurry for the fuel electrode to the obtained sheet-shaped solid electrolyte layer molding to thus form a sheet-shaped stacked molding. A surface on the fuel electrode molding side of the sheet-shaped stacked molding, on which the fuel electrode molding and the solid electrolyte layer molding are stacked, is stacked on a support molding to thus form a molding.

Next, the stacked molding described above is calcined for 2 to 6 hours at from 800 to 1200° C.

Next, for example, $ZrO_2$ in which $Y_2O_3$ has been dissolved as a solid and NiO are mixed and dried such that a volume ratio in the range of from 40:60 to 60:40 is reached, and an organic binder, and the like, is added to adjust a slurry for a second layer, then a second layer molding is formed by applying said slurry to the support molding between both end parts of the electrolyte layer molding.

Next, a slurry for a first layer is produced on the second layer molding (calcined body) using $ZrO_2$ powder in which the amount of the rare earth element oxide dissolved as a solid is less than the slurry for the solid electrolyte layer molding described above, a binder powder, and the like, and then, the slurry is applied in the form illustrated in FIGS. 1A and 1B and dried.

Next, a slurry is produced by mixing an interconnector material (for example, $LaCrMgO_3$-based oxide powder), an organic binder, and a solvent, both end parts of a molding for the interconnector are stacked on both end parts of the solid electrolyte molding (calcined body), and a slurry for the interconnector is applied so that one end part of the molding for the interconnector is stacked on the other ends of a first layer molding and the second layer molding.

Next, the stacked compact described above is subjected to a binder removal treatment, and co-sintering (co-firing) is carried out in an oxygen-containing atmosphere for 2 to 6 hours at from 1400 to 1450° C.

Then, by applying a slurry containing an oxygen electrode material (for example, an $LaCoO_3$-based oxide powder), a solvent, and a pore-forming agent on an intermediate layer through dipping, or the like, and baking the layer for 2 to 6 hours at from 1000 to 1300° C., the cell 1 according to the present embodiment, having the structure illustrated in FIGS. 1A to 4, can be produced.

Figure 5A:
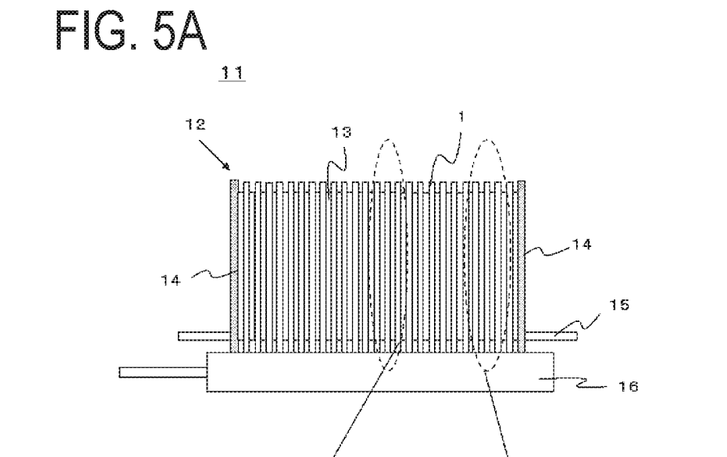
FIG. 5A is a side view schematically illustrating the cell stack device.
Figure 5B:
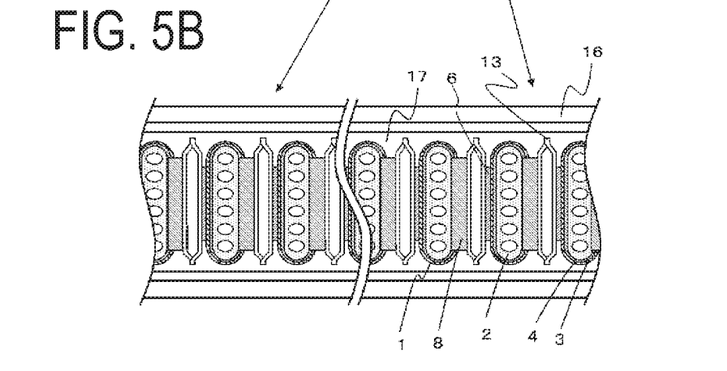
FIG. 5B is a cross-sectional view illustrating the part of the cell stack device surrounded by the broken line partially enlarged.

FIGS. 5A and 5B illustrate an example of a cell stack device configured by electrically connecting a plurality of the cells 1 described above in series through a conductive member 13, where FIG. 5A is a side surface view schematically illustrating a cell stack device, and FIG. 5B is a partially enlarged cross-sectional view of the cell stack device in FIG. 5A illustrating the extracted portions surrounded by the broken lines illustrated in FIG. 5A. Note that, in FIG. 5B, the portions corresponding to the portions surrounded by the broken lines illustrated in FIG. 5A are illustrated with arrows for clarity.

Note that, in a cell stack device 11, a cell stack 12 is configured by providing each of the cells 1 through the conductive member 13, where a lower end part of each of the cells 1 is secured to a gas tank 16 for supplying fuel gas to the cells 1 using an insulating bonding material 17, such as a gas seal material, or the like. In addition, the cell stack 12 is sandwiched from both ends in a direction in which the cell 1 is arranged using an elastically deformable electrically end part conductive member 14, the lower end of which is secured to the gas tank 16.

In addition, the end part conductive member 14 illustrated in FIGS. 5A and 5B is provided with a current extracting part 15, which has a shape extending in the direction in which the cell 1 is arranged toward an outside, for extracting electrical current generated by the power generation of the cell stack 12 (cell 1).

Figure 6:
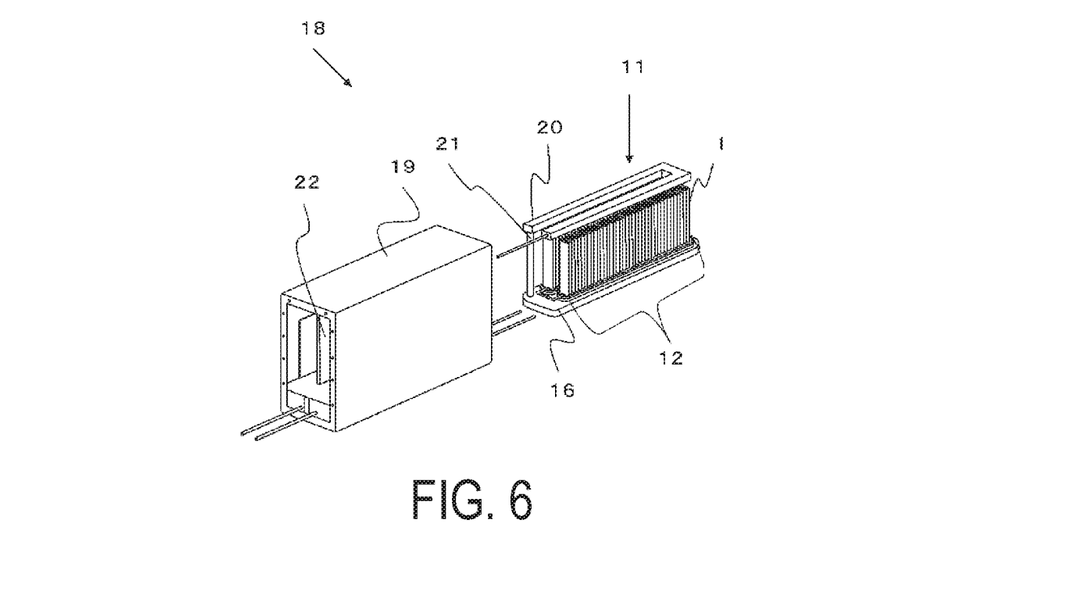
FIG. 6 is an exterior perspective view illustrating an example of a module.

FIG. 6 is an external perspective view illustrating an example of a fuel cell module 18 in which the cell stack device 11 is housed in a housing container, and the module is configured by housing the cell stack device illustrated in FIGS. 5A and 5B in a rectangular housing container 19.

Here, a reformer 20 for generating fuel gas by reforming raw fuel, such as natural gas or kerosene, and the like, is provided above the cell stack 12 in order to obtain the fuel gas to be used in the cell 1. Then, the fuel gas generated by the reformer 20 is supplied to the gas tank 16 through a gas distribution pipe 21, and is then supplied to the gas passage 2a provided in the cell 1 through the gas tank 16.

Note that FIG. 6 illustrates a state where parts (front and rear surfaces) of the housing container 19 have been removed, and the cell stack device and the reformer 20 housed therein have been removed to the rear. In the fuel cell module 18 illustrated in FIGS. 5A and 5B, the cell stack device 11 can be housed in the housing container 19 by being slid therein. Note that the cell stack device 11 may include the reformer 20.

In addition, in FIG. 6, a gas containing oxygen introducing member 22 provided in the housing container 19 is provided between a pair of the cell stacks 12 lined up in the gas tank 16, and gas containing oxygen is supplied to the lower end part of the cell 1 such that the flow of the gas containing oxygen is synchronized with the flow of the fuel gas so as to flow at the side of the cell 1 from the lower end part toward the upper end part. Then, by inducing a reaction between the fuel gas discharged from the gas passage 2a of the cell 1 with the gas containing oxygen to be burned at the upper end part side of the cell 1, the temperature of the cell 1 can be increased and the activation of the fuel cell stack device can be accelerated. In addition, the reformer 20 provided above the cell 1 (the cell stack 12) can be heated by burning the gas containing oxygen and the fuel gas discharged from the gas passage 2a of the cell 1 on the upper end part side of the cell 1. This enables the reformer 20 to carry out the reformation reaction efficiently.

Furthermore, because the cell stack device 11 using the fuel cell 1 described above is housed in the housing container 19 in the fuel cell module 18 according to the present embodiment, a fuel cell module 18 with improved power generation performance and improved long-term reliability can be obtained.

Figure 7:
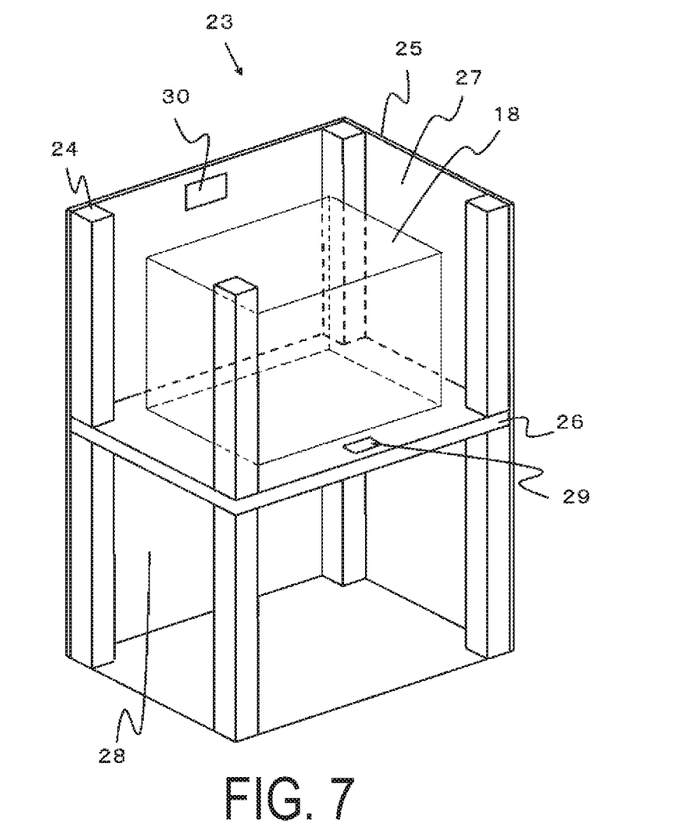
FIG. 7 is a perspective view illustrating a module housing device with a portion thereof omitted.

FIG. 7 is a perspective view illustrating an example of fuel cell device that is a module housing device formed by housing the fuel cell module 18 illustrated in FIG. 6 and an auxiliary device configured to operate the cell stack device in an external case. Note that some of the components of the configuration are not illustrated in FIG. 7.

In the fuel cell device 23 illustrated in FIG. 7, an external case formed of a strut 24 and an outer plate 25 is divided into an upper and a lower region using a divider 26, where the upper region forms a module housing chamber 27 for housing the fuel cell module 18, and the lower region forms an auxiliary device housing chamber 28 for housing the auxiliary devices configured to operate the fuel cell module 18. Note that the auxiliary devices housed in the auxiliary device housing chamber 28 are not illustrated.

Furthermore, an airflow port 29 for allowing air in the auxiliary device housing chamber 28 to flow into the module housing chamber 27 is provided in the divider 26, and an exhaust port 30 for exhausting air out of the module housing chamber 27 is provided in one of the outer plates 25 of the module housing chamber 27.

By configuring the fuel cell module 18 that is able to enhance long-term reliability by housing said module in the module housing chamber 27 in the fuel cell device 23 in this way, the long-term reliability of the fuel cell device 23 can be enhanced.

Note that, in addition to the examples described above, the cell may be one where the oxygen electrode 6, the solid electrolyte layer 4, and the fuel electrode 3 are provided on the support body.

Furthermore, while a description was given of a fuel cell, a fuel cell stack device, a fuel cell module, and a fuel cell device in the embodiment described above, the present invention is not limited thereto and application is also possible to an electrolytic cell (SOEC) which generates hydrogen and oxygen ($O_2$) by electrolyzing water vapor (water) by applying water vapor and voltage in a cell and to an electrolytic module and an electrolytic device provided with this electrolytic cell.

Figure 8:
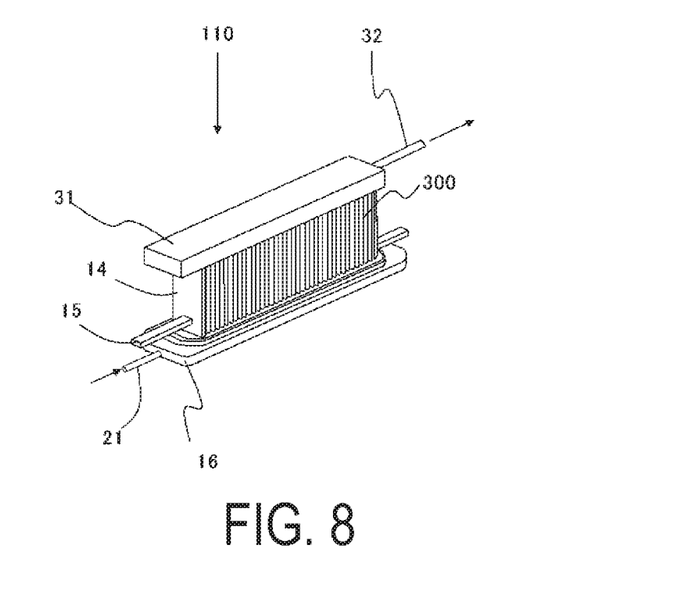
FIG. 8 is a perspective view illustrating another example of the cell stack device according to the present embodiment.

FIG. 8 illustrates an example of an electrolytic cell stack device. A one end (lower end) of a cell 300 is joined to a first gas tank 16 using a bonding material 17, and an other end (upper end) of the cell 300 is joined to a second gas tank 31 using the bonding material 17. The first gas tank 16 functions as a supply part for supplying high-temperature water vapor, and the second gas tank 31 functions as a recovering part for recovering generated hydrogen. A first gas circulating pipe 21 supplies water vapor, and a second gas circulating pipe 32 recovers hydrogen.

Figure 9:
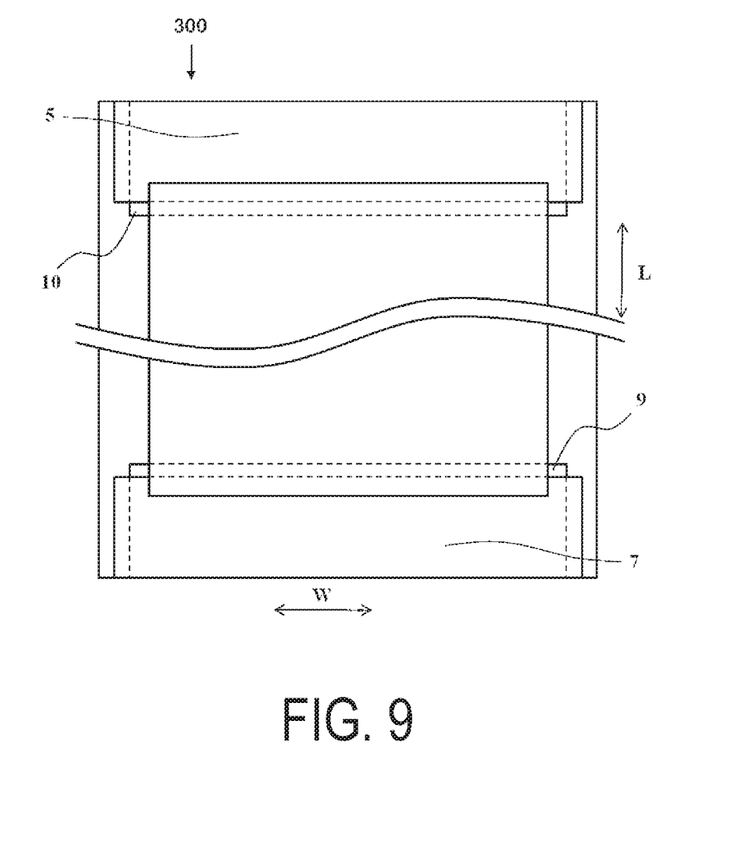
FIG. 9 is a side view as seen from the interconnector side illustrating another example of the cell according to the present embodiment.

FIG. 9 is a side view as seen from the interconnector side illustrating another example of the cell according to the present embodiment. The cell 300 illustrated in FIG. 9 is preferably used by the electrolytic cell stack device illustrated in FIG. 8.

In FIG. 9, a third layer 5 is provided on the other main surface of the other end of the support body 2 in the length direction. Furthermore, a fourth layer 10 is provided between the third layer 5 and the support body 2. Here, the material of the third layer 5 is the same as that of the first layer 7, and the material of the fourth layer 10 is the same as that of the second layer 9.

Using this configuration makes is possible to also enhance long-term reliability, and thus suppress peeling of the third layer 5, in the other end side of the cell 300, in the same way as in the one end side.

REFERENCE NUMERALS

2 Support body
2a gas passage
3 First electrode (fuel electrode)
4 Solid electrolyte layer
6 Second electrode (oxygen electrode)
7 First layer
8 Interconnector
9 Second layer
11 Cell stack device
18 Module (Fuel cell module)
23 Module housing device (fuel cell device

What is claimed is:

1. A cell comprising:
a support body comprising a length direction and a pair of main surfaces, the support body further comprising a material;
a power generation element comprising:
a first electrode,
a solid electrolyte layer comprising an oxide as a main component and further comprising a rare earth element oxide, and
a second electrode, which are stacked, in that order, on one of the main surfaces of the support body;
a first layer provided on the other main surface of the support body and located at one end part of the support body in the length direction; the first layer also comprising the oxide as a main component and the rare earth element oxide of which an amount of the rare earth element oxide in the first layer differs from an amount of the rare earth oxide in the solid electrolyte layer so that the first layer is stronger than the solid electrolyte layer; and
a second layer provided between the first layer and the support body, the second layer comprising the material at a higher content than the first layer, and also further comprising the oxide.

2. The cell according to claim 1, wherein the second layer extends farther to an other end part side in the length direction than the first layer.

3. The cell according to claim 1, further comprising:
an interconnector provided so as to cover an other end part in the length direction of the first layer; and
an area where the second layer is not provided located on the other main surface of the support body on the other end part side, wherein
the interconnector and the support body abut and are joined in this area.

4. The cell according to claim 1, wherein an other end part in the length direction of the second layer is tapered.

5. The cell according to claim 1, wherein an other end part in the length direction of the first layer is tapered.

6. A cell stack device comprising:
a plurality of the cells according to claim 1, wherein the plurality of the cells are electrically connected.

7. A module comprising:
the cell stack device according to claim 6 housed in a housing container.

8. A module housing device comprising:
the module according to claim 7 and an auxiliary device configured to operate the module housed in an external case.

* * * * *